US005275470A

United States Patent [19]

Miller

[11] Patent Number: 5,275,470

[45] Date of Patent: Jan. 4, 1994

[54] SCRAPING DEVICE FOR POWERED STONE FLOOR DRESSING UNIT

[75] Inventor: Charles E. Miller, Grand Blanc, Mich.

[73] Assignee: Prodigy Products, Inc., Flint, Mich.

[21] Appl. No.: 967,265

[22] Filed: Oct. 27, 1992

[51] Int. Cl.[5] ........................ B23D 79/10; F21C 25/18

[52] U.S. Cl. ........................................ 299/41; 15/93.1; 51/177; 299/93

[58] Field of Search ........................ 299/37, 41, 91, 93; 15/93.1; 51/174, 175, 177; 30/169, 170

[56] References Cited

U.S. PATENT DOCUMENTS 1,924,582 8/1933 Wineman .............................. 51/177
3,347,596 10/1967 Brejcha et al. ................... 51/177 X
4,202,093 5/1980 Wallerstein ........................... 30/169
4,295,274 10/1981 Bricher et al. .................. 15/93.1 X
4,490,879 1/1985 Colby .................................... 15/242
4,614,380 9/1986 Allen .................................... 299/41

*Primary Examiner*—David J. Bagnell
*Attorney, Agent, or Firm*—Weintraub, DuRoss & Brady

[57] ABSTRACT

A scraping device for use on powered stone floor dressing units which includes a solid support body and a scraping blade fastened to the support body. The support body is T-shaped, made from hardened steel and is mountable to a floor dressing unit by a universal locking bracket. The scraping blade is removably attachable to the support body, has a plurality of scraping edges available for use and is usually made from a carbon alloy, thereby providing a durable tool for extended use.

13 Claims, 1 Drawing Sheet

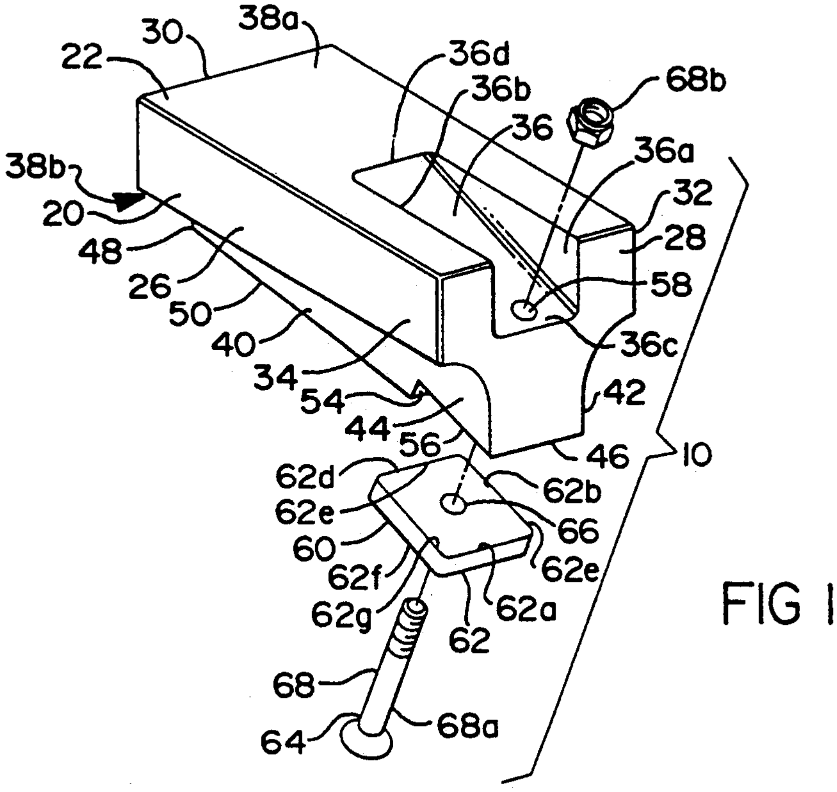
FIG 1
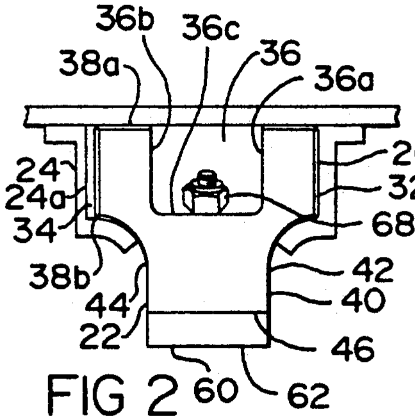
FIG 2
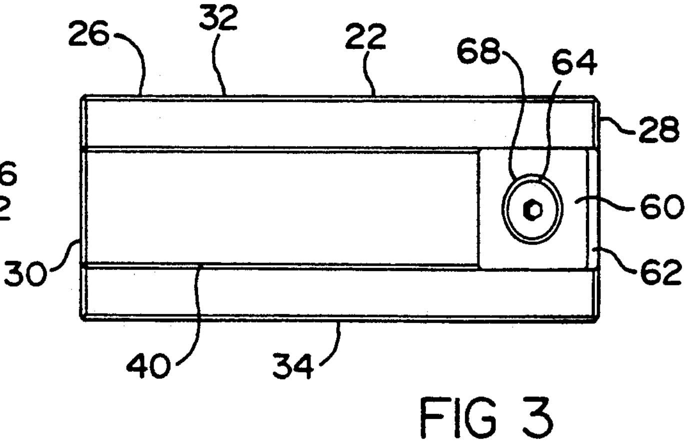
FIG 3
FIG 4
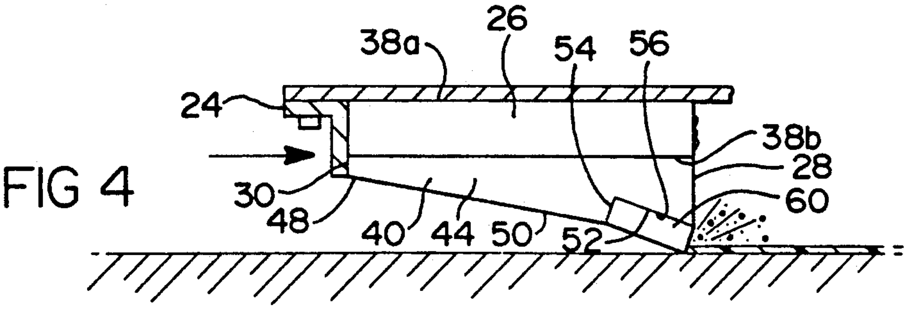

SCRAPING DEVICE FOR POWERED STONE FLOOR DRESSING UNIT

BACKGROUND OF THE INVENTION

1. Field of the Invention

This invention relates to scraping tools or devices. More particularly this invention relates, to scraping devices used for stone floor dressing. Even more particularly, this invention relates to scraping devices used for powered stone floor dressing units.

2. Prior Art

Scraping and cleaning floors, including stone floors, has a long history extending from manual scraping by hand to automatic scraping using powered equipment. Powered floor scrapers as stated above, have long been an established part of floor scraper history.

One of the most common powered floor scrapers has a powered rotary unit which uses a plurality of scraping tools attached to a rotating plate to scrape and clean a floor. Where such a floor scraper is used, the scraping tools are replaceable as they wear out. Earlier scraping units used scraping tools having only one scraping edge that required constant sharpening. After being sharpened several times the scraping tool was discarded and replaced by a new tool. For example, U.S. Pat. No. 1,924,582, discloses a resurfacing machine which uses a single edge tool that requires constant sharpening and eventual replacement. Also, the tool can become damaged in a relatively short time period because the fastener can vibrate loose and permit the tool to turn and flop around.

U.S. Pat. No. 4,614,380 discloses a scraping tool which consists of several pieces and fasteners. This can result in the tool and/or parts being replaced more often than encountered in the single piece tool above. Likewise, the multiple fasteners may become loose during use. Also, the various pieses may suffer damage or become misshapened. This requires replacement of the part or the entire tool. Although the patent teaches a multi-edged scraping blade which reduces the number of times the blade will need to be replaced the balance of the tool still consists of several pieces that require frequent replacement.

U.S. Pat. No. 4,490,879 discloses a scraping tool used to clean chimneys which welds the scraping blade to a blade support. Although this tool reduces the number of pieces to make up a tool, it still can be deformed with constant usage and still has only one scraping surface which requires constant sharpening.

It would be desirable to have a scraping tool for use with a powered rotary floor dressing device that can be easily installed, provide a blade support that will not deform and provide a multiple edge scraping blade.

SUMMARY OF THE INVENTION

The present invention provides a scraping device for a powered stone floor dressing unit which generally comprises:

(a) a support body, the support body being mountable onto a floor dressing unit;

(b) means for insertably mounting the support body to the floor dressing unit;

(c) a scraping blade, the scraping blade being removably attachable to the support body, the blade having a plurality of scraping edges; and (d) means for removably attaching the scraping blade to the support body.

The support body of the scraping device is essentially an elongated T-shaped member having a mounting portion and a blade holding portion. The mounting portion is insertable into a locking member provided on the floor dressing unit and secured in place. The blade holding portion has the scraping blade removably mounted thereon to by a fastener or the like.

The blade holding portion of the support body positions the scraping blade so that a scraping edge is available for contact with the floor surface.

For a more complete understanding of the present invention reference is made to the following detailed description and accompanying drawing. Throughout the following description and drawings, identical reference numbers refer to the same component throughout the several views, in which:

BRIEF DESCRIPTION OF THE DRAWINGS

FIG. 1 is an exploded perspective view of the invention;

FIG. 2 is a front end view of the invention;

FIG. 3 is a bottom plan view of the invention; and

FIG. 4 is a side view of the invention.

DETAILED DESCRIPTION OF THE INVENTION

As shown in the drawing, there is provided a floor scraping device, generally denoted at 10 which is used for powered stone floor dressing units or the like. The scraping device 10 hereof comprises:

(a) a support body 20, the support body 20 insertably mountable onto a floor dressing unit (not shown);

(b) means 24 for insertably mounting the support body 20 to the floor dressing unit;

(c) a scraping blade 60, the scraping blade 60 removably attachable to the support body 20; the scraping blade 60 having a plurality of scraping edges 62, **62*a*, 62*b*, 62*c*, 62*d*, 62*e*, 62*f*, 62*g*; and (d) means 64 for removably attaching the scraping device 60 to the support body 20**.

The scraping device 10 defines a solid support body 20 for the scraping blade 60. The support body 20 comprises an elongated T-shaped member 22 having of a mounting portion 26 and a blade holding portion 40.

The mounting portion 26 of the support body 20 includes a front end 28 and a rear end 30, a first side 32 and a second side 34 and a top surface **38*a* and a bottom surface 38*b*. The mounting portion 26 has an elongated slot 36 formed therein proximate the front end 28 and median the first side 32 and the second side 34. The slot 36 extends from the front end 28 of the support body 20 to approximately median the front end 28 and the rear end 30**.

The slot 36 is partially surrounded by two walls **36*a*, 36*b* and a base 36*c* integrally connected to the walls 36*a*, 36*b*. The base 36*c* extending angularly between the walls 36*a* and 36*b* from the front end 28 proximate to the bottom surface 38*b* to the top surface 38*a* proximate the end 36*d* of the slot 36. The slot 36 provides clearance for the means 64 for removably attaching the scraping blade 60 to the support body 20**.

The blade holding portion 40 of the support body 20 is integrally formed with the mounting portion 26 of the support body 20. The blade holding portion 40 depends downward from the bottom surface **38*b* of the mounting portion 26 essentially median the first side 32** and the second side 34 of the mounting portion. The holding portion 40 extends from the front end 28 to the rear end 30 of the mounting portion.

The blade holding portion 40 includes a third side 42 and a fourth side 44, a blade mounting end 46, a clearance end 48, and an angular surface 50 with the angular surface 50 extending angularly upward from the blade mounting end 46 to the clearance end 48.

The angular surface 50 has a seating notch 52 formed therein proximate the blade mounting end 46. The seating notch 52 is formed to provide a seat for the scraping blade 60 when assembled to the support body 20. The notch 52 is defined by a backstop 54 and a seating surface 56. The seating surface 56 is essentially parallel with the base 36c of the slot 36.

The support body 20 has a hole 58 formed therethrough from the seating surface 56 of the notch 52 to the base 38c of the slot 36 for the means 64 for attaching to be used to secure the scraping blade 60. The support body 20 is made from hardened steel, preferably case hardened steel, but may be made from any type of hardened metal or other materials capable of withstanding the scraping pressure.

The scraping blade 60 is essentially rectangular with a plurality of blade edges 62 62*a*, 62*b*, 62*c*, 62*d*, 62*e*, 62*f*, 62*g*, preferably eight blade edges, for scraping stone floors. The scraping blade 60 is removably attachable within the seating notch 52 of the support body 20 via the means 64 for removably attaching the blade 60 to the support body 20.

The blade 60 has a second hole 66 formed therethrough concentric with the hole 58 in the support body 20.

The means 24 for insertably mounting the support body 20 to the floor dressing unit is attached to the floor dressing unit and locks the support body 20 to the dressing unit. The means 24 for insertably mounting the support body 20 is preferably a locking member 24*a*. The mounting portion 26 of the body 20 is inserted into the locking member 24*a* and is secured to the floor dressing unit.

The scraping blade 50 is preferably made from carbon or carbide alloys which are known to those skilled in the art and are commercially available. The scraping blade 60 may also be made from other hard materials such as bonded industrial diamonds.

The means for attaching the scraping blade 60 to the support body 20 is preferably a fastener 68. The fastener 68 includes a flat head screw 68*a* with a locking nut 68*b* which are known in the art and are commercially available. The fastener 68 prevents the scraping blade 60 from becoming loose during operation, but is designed to permit the blade to be easily adjusted for wear.

In use the scraping device 10 is easily installed onto a powered floor dressing unit by inserting the scraping device 10 into the locking member 24 attached to the dressing unit and secured in place. No fasteners are inserted into the support body 20 to hold the scraping device 10 onto the dressing unit. However, fasteners may be used instead of the locking device 24, if desired.

When a scraping blade 60 edge 62 becomes worn, the fastener 68 is loosened, the blade 60 is adjusted to a usable edge 62*a*, and the fastener 68 is tightened. The scraping blade 60 is used until all the edges 62, 62*a*, 62*b*, 62*c*, 62*d*, 62*e*, 62*f* and 62*g* are dull. A new blade 60 is installed for the worn blade 60 and the worn blade is resharpened. The blade 60 exchange can be accomplished without removing the support body 20 from the dressing unit.

The scraping device 10 of the present invention provides the user with a tool that can be easily installed, removed and serviced. Also, the useful life of the tool extended by the reduced number of parts subject to abuse.

Although the present invention has been described herein with respect to a specific embodiment thereof, it will be understood that the foregoing description is intended to be illustrative and not restrictive. Many modifications of the present invention will occur to those skilled in the art. All such modifications which fall within the scope of the appended claims are intended to be within the scope and spirit of the present invention.

Having, thus, described the invention, what is claimed is:

1. A scraping device for a powered floor dressing unit comprising:
   (a) a solid support body, the solid support body insertably mountable onto a floor dressing unit;
   (b) means for insertably mounting the solid support body to the floor dressing unit;
   (c) a scraping blade, the scraping blade being removably attachable to the solid support body, the scraping blade having a plurality of scraping edges thereon; and
   (d) means for removably attaching the scraping blade to the solid support body.

2. A scraping device for a powered floor dressing unit comprising:
   (a) a support body comprising a T-shaped member with a mounting portion and a blade holding portion, the support body insertably mountable onto a floor dressing unit;
   (b) means for insertably mounting the support body to the floor dressing unit;
   (c) a scraping blade, the scraping blade being removably attachable to the support body, the scraping blade having a plurality of scraping edges thereon; and
   (d) means for removably attaching the scraping blade to the support body.

3. The scraping device of claim 2, wherein the mounting portion includes a front end and a rear end, a first side and a second side, and a top surface and a bottom surface, the top surface of the mounting portion having an elongated slot formed therein parallel and medial to the first and second sides and extending from the front end to approximately median the front end and the rear end.

4. The scraping device of claim 3, wherein the blade holding portion depends substantially normal from the bottom surface of the mounting portion, the holding portion being medial to the first and second sides extending from the front end to the rear end of the mounting portion, the holding portion having a third side and a fourth side, a blade mounting end and a clearance end, and an angular surface, the angular surface extending upward from the blade mounting end to the clearance end, the angular surface having a seating notch formed therein for seating the scraping blade proximate the blade mounting end.

5. The scraping device of claim 4, wherein the slot is defined by two walls opposite each other and a base integrally connected to the walls, the base extending angularly between the walls from the front end of the mounting portion proximate the bottom surface to the top surface proximate the end of the slot.

6. The scraping device of claim 5, wherein the seating notch is defined by a backstop and a seating surface, the seating surface being parallel with the base portion of the slot in the mounting portion.

7. The scraping device of claim 2, wherein the means for insertably mounting the support body to the floor dressing unit comprises a locking member, the locking member attached to the floor dressing unit, the locking member securing the support body to the floor dressing unit.

8. The scraping device of claim 2, wherein the support body is made from a case hardened steel.

9. A scraping device for a powered floor dressing unit comprising:

(a) a support body, the support body insertably mountable onto a floor dressing unit;

(b) means for insertably mounting the support body to the floor dressing unit;

(c) a scraping blade, the scraping blade being removably attachable to support body, the scraping blade having a plurality of scraping edges thereon; and (d) means for removably attaching the scraping blade to the support body; wherein the support body comprises a T-shaped member with a mounting portion and a blade holding portion; wherein the mounting portion includes a front-end and a rear-end, a first side and a second side, and a top surface and a bottom surface, the top surface of the mounting portion having an elongated slot formed therein parallel and medial to the first and second sides and extending from the front-end to approximately median the front-end and the rear-end; wherein the blade holding portion depends substantially normal from the bottom surface of the mounting portion, the holding portion being medial to the first and second sides extending from the front-end to the rear-end of the mounting portion, the holding portion having a third side and a fourth side, a blade mounting end and a clearance end, and an angular surface, the angular surface extending upward from the blade mounting end to the clearance end, the angular surface having a seating notch formed therein for seating the scraper blade proximate the blade mounting end; wherein the slot is defined by two walls opposite each other and a base integrally connected to the walls, the base extending angularly between the walls from the front-end of the mounting portion proximate the bottom surface to the top surface proximate the end of the slot; wherein the seating notch is defined by a backstop and a seating surface, the seating surface being parallel with the base portion of the slot in the mounting portion; wherein the support body having a hole formed therethrough from the seating surface of the seating notch in the blade portion to the base of the slot in the mounting portion, the hole in the support body providing access for the means for removably attaching the scraper blade to the support body.

10. The scraping device of claim 9, wherein the scraping blade is rectangular, the scraping blade having a hole formed therethrough providing access for the means for attaching the scraping blade to the support body, the hole formed therethrough the scraping blade being concentric with the hole formed therethrough the support body.

11. The scraping device of claim 10, wherein the means for attaching the scraping blade to the support body comprises a threaded fastener and a lock nut.

12. The scraping device of claim 10, wherein the scraping blade is made from a carbon alloy.

13. The scraping device of claim 10, wherein the scraping blade is made from bonded industrial diamonds.

* * * * *